United States Patent [19]
Larky et al.

[11] Patent Number: 5,983,315
[45] Date of Patent: Nov. 9, 1999

[54] SYSTEM AND METHOD FOR ESTABLISHING PRIORITIES IN TRANSFERRING DATA IN BURST COUNTS FROM A MEMORY TO A PLURALITY OF FIFO STAGES, EACH HAVING A LOW, INTERMEDIATE, AND HIGH REGION

[75] Inventors: Steven P. Larky, Del Mar; Eric J. Fogleman, San Diego, both of Calif.

[73] Assignee: Rockwell Science Center, Inc., Thousand Oaks, Calif.

[21] Appl. No.: 08/845,594

[22] Filed: Apr. 25, 1997

[51] Int. Cl.$^6$ .............................. G06F 13/00; G06F 13/34
[52] U.S. Cl. .............................. 711/109; 711/110; 711/15; 345/521; 365/78; 710/52
[58] Field of Search ..................................... 711/109, 110, 711/158; 375/372; 365/78, 52; 395/877, 873; 710/53, 57; 345/521

[56] References Cited

U.S. PATENT DOCUMENTS

| | | | |
|---|---|---|---|
| 5,295,246 | 3/1994 | Bischoff et al. | 395/854 |
| 5,473,756 | 12/1995 | Taylor | 395/877 |
| 5,506,967 | 4/1996 | Barajas et al. | 711/118 |
| 5,519,701 | 5/1996 | Colmant et al. | 370/412 |
| 5,664,116 | 9/1997 | Gaytan et al. | 709/234 |
| 5,767,866 | 6/1998 | Chee et al. | 345/521 |

FOREIGN PATENT DOCUMENTS 62-082043   4/1988   Japan .

Primary Examiner—Eddie P. Chan
Assistant Examiner—Hong Kim
Attorney, Agent, or Firm—Merchant & Gould

[57] ABSTRACT

Each of a plurality of FIFO has (1) a low region indicating a minimum number of words for FIFO storage, (2) a burst count indicating the number of words involved in each transfer to such FIFO and (3) a high region where a word count transfer into the FIFO is not initiated. However, a burst count transfer initiated before the beginning of a FIFO high region may be completed in the FIFO high region. Each FIFO is initially filled from a memory by a memory controller to the low FIFO region. Upon word transfer from each FIFO, the memory controller establishes a priority to provide an additional burst count to the FIFO low region. When the memory controller is otherwise idle and the number of words in such FIFO is in a region intermediate the FIFO low and high regions, a burst count for each FIFO may be transferred into the intermediate FIFO region. The memory controller and each FIFO respectively remember the number of words transferred into and from such FIFO. The difference between the number of words transferred into and from each FIFO indicates whether the words in such FIFO are in the low, intermediate or high region. The individual value of the number of words for each FIFO low region and the burst count for such FIFO help to establish the controller priority in transferring burst counts at any instant to such FIFO relative to burst count transfers at such instant to other FIFO.

21 Claims, 3 Drawing Sheets

SYSTEM AND METHOD FOR ESTABLISHING PRIORITIES IN TRANSFERRING DATA IN BURST COUNTS FROM A MEMORY TO A PLURALITY OF FIFO STAGES, EACH HAVING A LOW, INTERMEDIATE, AND HIGH REGION

This invention relates to a system for, and a method of, establishing priorities to a memory controller in transferring data words from a memory to individual ones of a plurality of first-in-first-out registers (FIFO).

BACKGROUND OF THE INVENTION

Computer systems perform a number of different functions. For example, they employ a display monitor to display an image on the face of the display monitor. This image may be formed in part from a graphics image, in part from a video image and in part from a cursor which points to a particular position on the screen. The information for each individual one of these different images may be stored in a memory and may be transferred from the memory by a memory controller to an individual one of a plurality of first-in-first-out registers (FIFO). Each FIFO is constructed and connected to store such data and to transfer such data to apparatus for processing such data and for transferring the processed data at the appropriate times to the display monitor for display on the face of the display monitor. In this way, graphics information can be displayed on the face of the display monitor except for a window in the display monitor and video can be displayed in a window on the face of the display monitor.

The information stored in the memory and read by the memory controller may be for a variety of different purposes. For example, some of such information may relate to different types of commands such as for transferring information and addresses into the memory; other types of such information may relate to information which is to be processed by peripheral equipment (e.g. a printer) other than the display memory; and still other types of information may relate to different types of displays (e.g. graphics and video) in the display monitor such as specified above.

The memory controller has to decide at each instant what priority it should give to the memory with respect to the different types of information to be transferred into and out of the memory. Relatively complex systems have been provided in the past to establish such priorities. Because these systems have been relatively complex, they have been relatively slow.

BRIEF DESCRIPTION OF THE INVENTION

In one embodiment of the invention, each of a plurality of FIFO has (1) a low region indicating a minimum number of words for FIFO storage, (2) a burst count indicating the number of words involved in each transfer to such FIFO and (3) a high region where a burst count transfer into the FIFO is not initiated. However, a burst count transfer initiated before the beginning of a FIFO high region may be completed in the FIFO high region.

Each FIFO is initially filled from a memory by a memory controller to the low FIFO region. Upon a word transfer from each FIFO, the memory controller initiates an additional burst count to the FIFO low region. When the memory controller is otherwise idle and the number of the words in such FIFO is in a region intermediate the FIFO low and high regions, a burst count for each FIFO may be transferred into the intermediate FIFO region.

The memory controller and each FIFO respectively remember the number of words transferred into and from such FIFO. The difference between the number of words transferred into and from each FIFO indicates whether the words in such FIFO are the low, intermediate or high region of such FIFO. The individual value of the number of words for each FIFO low region and the burst count for such FIFO help to establish the controller priority in transferring burst counts at any instant to such FIFO relative to burst count transfers at such instant to other FIFO.

DETAILED DESCRIPTION OF THE INVENTION

Figure 1:
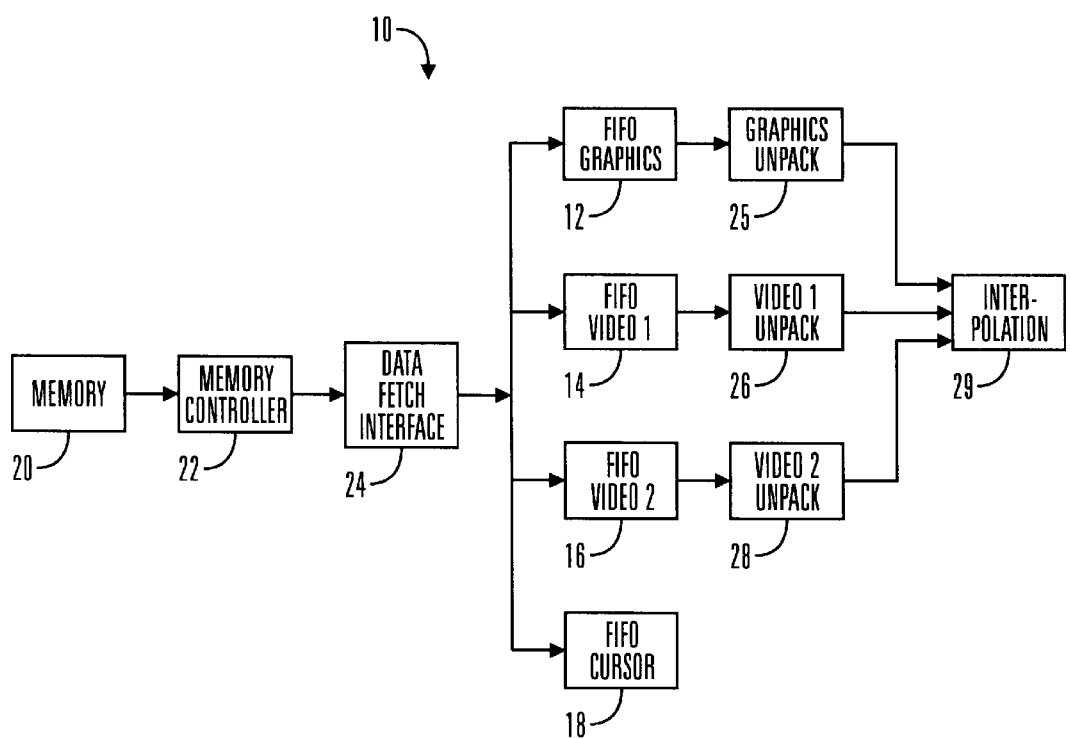
FIG. 1 is a circuit diagram, primarily in block form, schematically illustrating one embodiment of the invention.

FIG. 1 is a diagram, primarily in block form, of a system, generally indicated at 10 and constituting one embodiment of the invention, for establishing priorities for a number of different storage elements such as FIFO to receive and transfer data words. For example, the system 10 may include a first-in-first-out register (FIFO) 12 for receiving and storing words relating to a graphics image, a FIFO 14 for receiving and storing words relating to a first video image, a FIFO 16 for receiving and storing words relating to a second video image different from the first video image and a FIFO 18 for receiving and storing words relating to a cursor. Each of the FIFO 12, 14, 16 and 18 may be constructed in a conventional manner. Each of such FIFO receives data words at a first frequency at an input end of the FIFO and transfers such words at a second frequency from an output end of the FIFO in the same order as the words are received at the input end. Although four (4) FIFOs are shown in FIG. 1, it will be appreciated that any number of FIFO other than four (4) may be provided without departing from the scope of the invention. The transfer of the data words into the FIFO 12, 14, 16 and 18 may be provided from a memory 20 the operation of which may be controlled by a memory controller 22. The memory 20 and the memory controller 22 may be constructed in a manner well known in the art. The operation of the memory controller 22 may be in turn controlled by a data fetch interface 24 which may be considered to be unique to this invention. The data fetch interface 24 establishes, in a manner which will be described in detail subsequently, the priorities in which data words are transferred from the memory 20 to the FIFO 12, 14, 16 and 18 by the memory controller 22. The data words transferred to the FIFO 12, 14 and 16 are respectively unpacked by unpackers 25, 26 and 28 in a manner well known in the art and the unpacked words are then processed or interpolated, as indicated at 29 in FIG. 1, in a manner well known in the art to provide images on the face of a display monitor (not shown).

Figure 3:
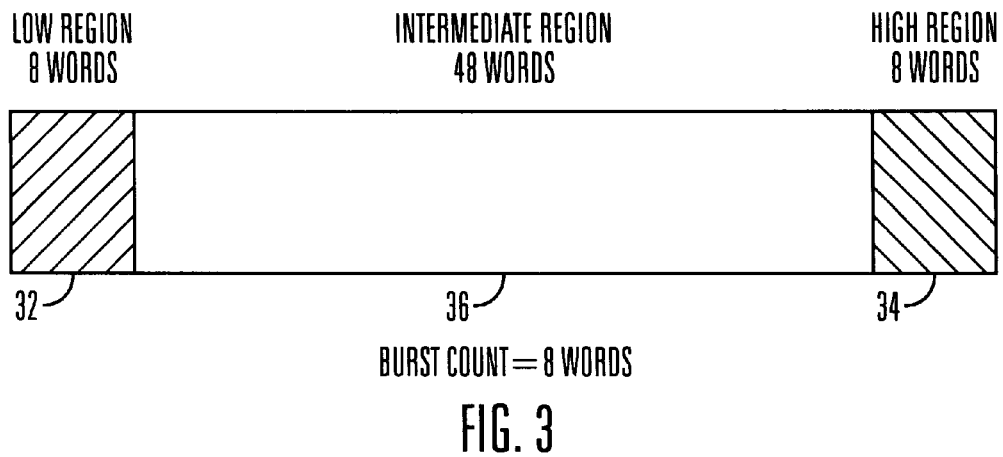
FIG. 3 is a diagram schematically illustrating the relative priority provided to one of the FIFO shown in FIGS. 1 and 2.
Figure 4:
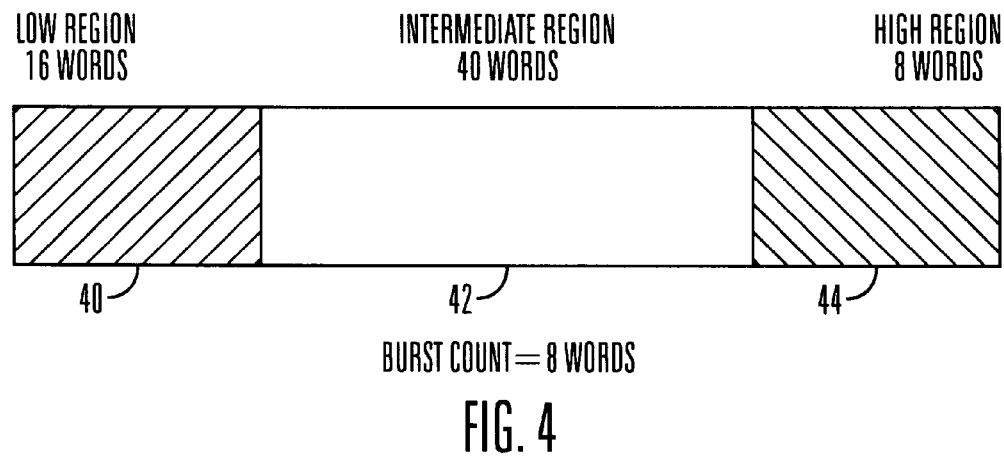
FIG. 4 is a diagram schematically illustrating the relative priority provided to a second one of the FIFO shown in FIGS. 1 and 2.
Figure 5:
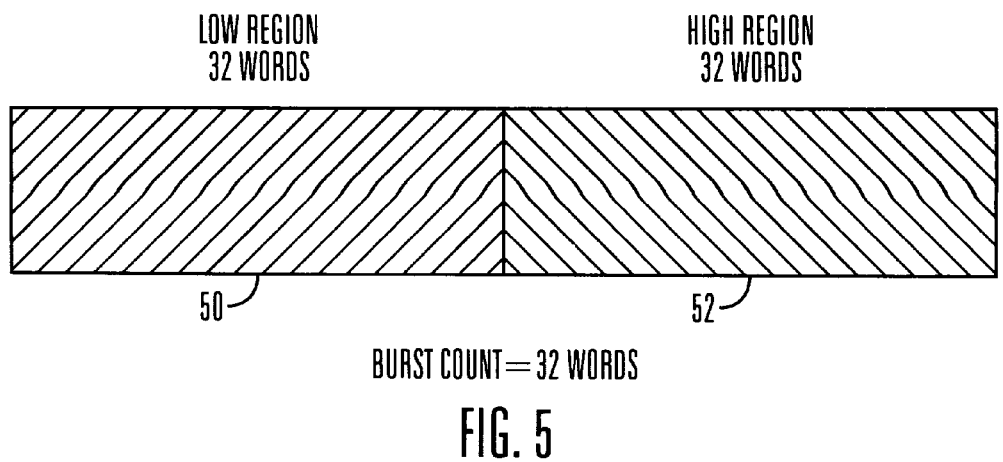
FIG. 5 is a diagram schematically illustrating the relative priority provided to a third one of the FIFO shown in FIGS. 1 and 2.

FIGS. 3, 4 and 5 illustrate on a schematic basis how priorities are established in different one of the FIFO 12, 14 and 16. Each of the FIFO 12, 14 and 16 has a "low" region which should always be filled with data words on a priority basis. For example, the "low" region 32 of the FIFO 12 may illustratively constitute eight (8) data words. This is shown schematically in FIG. 3. Whenever there are less than eight (8) words in the FIFO 12, the FIFO 12 is filled with additional data words on a priority basis so that there is always a count of at least eight (8) data words in the FIFO.

The data words are filled in each of the FIFO 12, 14 and 16 on the basis of a "burst count" for such FIFO. This burst count for a FIFO constitutes the number of the words that is transferred in a block to such FIFO whenever such a transfer occurs. For example, the burst count in the FIFO 12 may be eight (8) data words. This indicates that, whenever a transfer of words from the memory 20 to the FIFO 12 occurs, such a transfer is in a burst count, or block, of eight (8) data words.

Each of the FIFO 12, 14 and 16 has a "high" region. The "high" region for each FIFO is greater than the low region for such FIFO. It indicates the region in a FIFO where a transfer of a burst count cannot be initiated. One of the purposes of providing the high region in a FIFO is to prevent the FIFO from being overfilled. For example, the FIFO 12 may be provided with a total capacity of sixty four (64) data words. The "high" region 34 of the FIFO 12 may constitute eight (8) words. These eight (8) words may be considered to constitute the last eight (8) words in the FIFO. Although the FIFO 12 is disclosed as having the same number of words in the low region 32 and the high region 34, the number of words in the low region for a FIFO and the number of words in the high region for such FIFO may be different. Furthermore, although the FIFO 12 has the same number of words in the low region 32 as the burst count, these numbers may be different for such FIFO as well as for other FIFO.

As will be seen in FIG. 3 and from the discussion above, the FIFO 12 has a region 36 of forty eight (48) words between the low region and the high region of the FIFO. This region may be considered as an intermediate region. The burst count of eight (8) words may be filled in the intermediate region 36 but only at times when the memory controller 22 is idle—in other words, when the memory controller 22 is not transferring words into the memory 20 or out of the memory on a priority basis to the FIFO or to or from any other stages in the system.

At such idle times of the memory controller 22, burst counts of eight (8) words may be successively transferred into the intermediate region 36 of the FIFO 12 until the intermediate region 36 becomes filled. The transfer of the burst count of eight (8) data words into the FIFO 12 may be initiated when there are some empty words in the intermediate region 36 of the FIFO and such transfer may be completed by partially filling the high region 34 of the FIFO. However, a transfer of the burst count of eight (8) words may not be initiated into the FIFO 12 when the number of words in the FIFO extends into the region 36 before any transfer of such burst count is initiated.

FIG. 4 illustrates the parameters of the FIFO 14. For example, the low region 40 of the FIFO 14 may constitute sixteen (16) data words, the intermediate region 42 of the FIFO may constitute thirty two (32) data words and the high region of the FIFO may constitute sixteen (16) words, the FIFO having a total capacity of sixty four (64) words. The burst count of the FIFO 14 may constitute eight (8) words. As with the FIFO 12, the number of data words in the low region 40, the intermediate region 42 and the high region 44 of the FIFO 14 may not have any numerical interrelationship to one another provided that the sum of the three (3) regions should equal the total capacity of the FIFO, this capacity being illustratively sixty four (64) words. Furthermore, the burst count in the FIFO 14 may not have any interrelationship to the number of words in any of the low region 40, the intermediate region 42 and the high region 44 of the FIFO.

FIG. 5 illustrates the parameters of the FIFO 16. As shown, the FIFO 16 may have a capacity of sixty four (64) words. The low region 50 of the FIFO 16 may constitute thirty two (32) words and the high region may also constitute thirty two (32) words. There would accordingly be no intermediate region in the FIFO 16. The burst count in the FIFO 16 may be thirty two (32) words. Again, there may be no interrelationship between the number of words in the low region 50 and the high region 52 and the burst count in the FIFO 16. The total capacities of the FIFO 12, 13, and 16 may also be different from one another.

As a first step in the operation of applicants' system and method, the FIFO 12, 14 and 16 may be initially filled to at least their low regions on a priority basis. This would require the FIFO 12 to receive one (1) burst count of eight (8) data words, the FIFO 14 to receive two (2) burst counts of eight (8) data words and the FIFO 16 to receive one (1) burst count of thirty two (32) data words. The bandwidth requirements of the FIFO 16 would initially be greater than the bandwidth requirement of the FIFO 14 and the bandwidth requirements of the FIFO 14 would initially be greater than the bandwidth requirement of the FIFO 12.

Assume that one (1) word is subsequently transferred from each of the FIFO 12, 14 and 16. A burst count would then be transferred into each of the FIFO 12, 14 and 16 under the control of the data fetch interface 24 and the memory controller 22 to fill each FIFO to at least the low region of such FIFO. As a result, there would be fifteen (15) data words in the FIFO 12, twenty three (23) data words in the FIFO 14 and sixty three (63) data words in the FIFO 16. No additional data words could be thereafter transferred into the FIFO 16 until thirty two (32) additional data words were transferred from the FIFO. On the other hand, six (6) additional burst counts, each of eight (8) data words, could be transferred into the FIFO 12 under the control of the data fetch interface 24 and the memory controller 22 during the idle time of the memory controller 22. In like manner, five (5) burst counts, each of eight (8) data words, could be transferred into the FIFO 14 under the control of the data fetch interface 24 and the memory controller 22 during the idle time of the memory controller 22.

As will be seen from the above discussion, the bandwidth for each of the FIFO 12, 14 and 16 is dependent upon the burst count for that FIFO. For example, the initial bandwidth requirement of the FIFO 16 is greater than that of the FIFO 12 and 14 because the burst count of the FIFO 16 is greater than those of the FIFO 12 and 14 and because the number of words in the low region of the FIFO 16 is greater than the number of words in each of the FIFO 12 and 14. In like manner, the bandwidth requirements of the FIFO 14 are initially greater than the bandwidth requirements of the FIFO 12 because the number of words in the low region of the FIFO 14 is greater than the number of words in the low region of the FIFO 12. Such parameters as the burst count and the number of words in the low region for each FIFO may be adjusted during the operation of the FIFO.

In a limited aspect of the invention, the number of the data words in the low region of a FIFO may correspond to the burst count for the FIFO. Under such circumstances, the use of a programmed burst count controls use of the bandwidth in two (2) ways. Increasing the burst count for all FIFO adjusts the amount of bandwidth used by the data fetch interface 24 and the FIFO 12, 14 and 16 relative to other stages which are controlled by the memory controller 22. In addition, by using separate burst counts for each of the FIFO 12, 14 and 16, the definition of the low and high regions for each FIFO is individually defined and the sharing of the bandwidth of the memory controller 22 between the different FIFO is adjusted.

The memory controller 22 keeps account of the number of the data words transferred into each of the FIFO 12, 14 and 16. Each of the FIFO 12, 14 and 16 keeps account of the number of the data words transferred from the FIFO. The difference between the number of the words transferred into one of the FIFO 12, 14 and 16 at any instant and the number of the words transferred from such FIFO at that instant indicates whether the number of the words in such FIFO at that instant is in the low region, the intermediate region (assuming that there is an intermediate region) or the high region of such FIFO at that instant.

Figure 2:
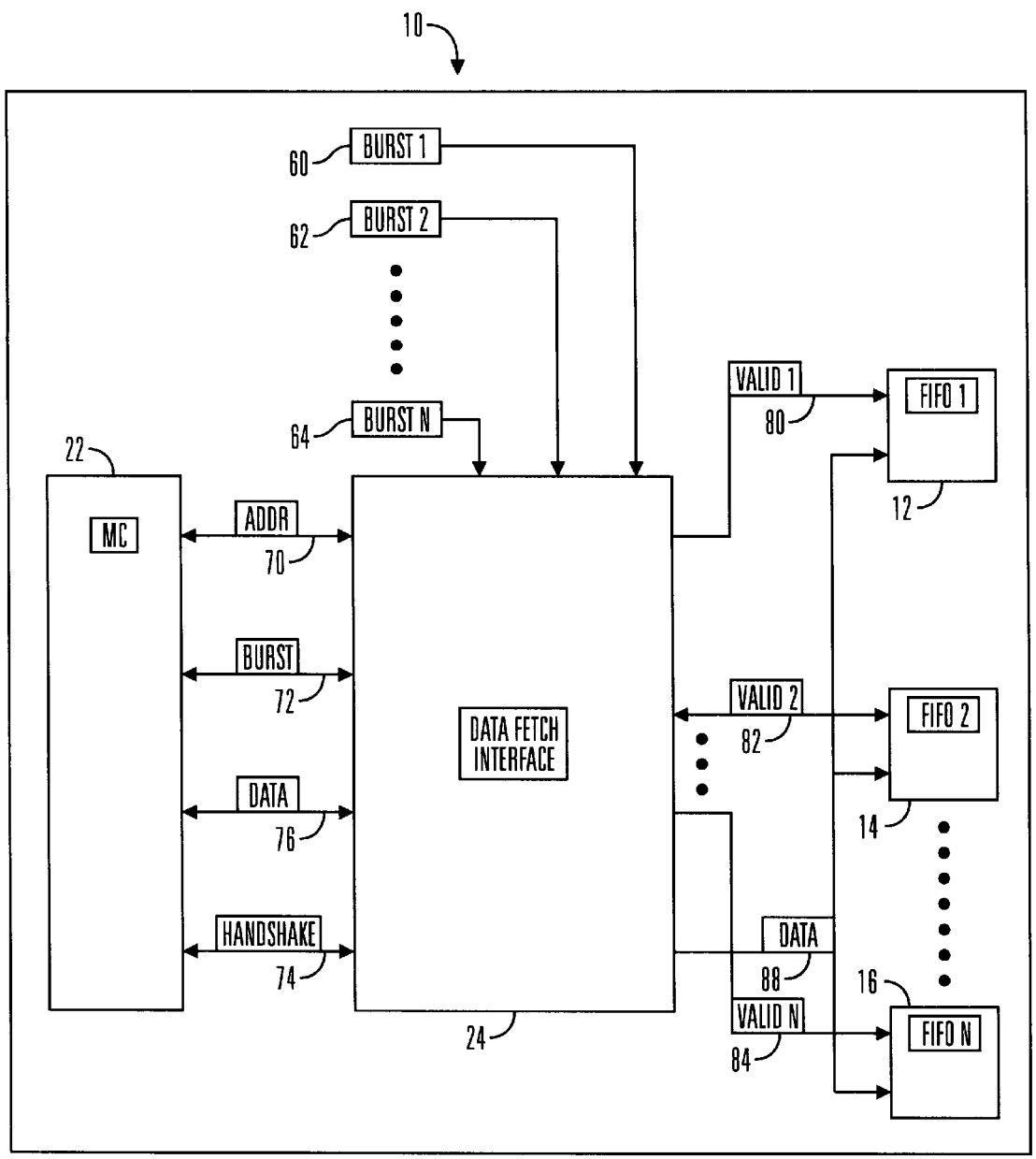
FIG. 2 is a circuit diagram, primarily in block form, schematically illustrating different aspects of the embodiment shown in FIG. 1.

FIG. 2 shows the memory controller 22, the data fetch interface 24 and the FIFO 12, 14 and 16. These FIFO are respectively designated as FIFO 1, FIFO 2 and FIFO N to show that there may be N FIFO in the system. There are a number of enlarged dots between the FIFO 2 and the FIFO N to show that there may be additional FIFO between the FIFO 2 and the FIFO N. As shown in FIG. 2, indications (respectively designated as burst 1, burst 2 and burst N) are provided at 60, 62 and 64 of the number of words in each burst count for the respective ones of the FIFO 12, 14 and 16. These indications are introduced to the data fetch interface 24.

As shown in FIG. 2, the data fetch interface 24 passes on a line 70 the address of an individual one of the FIFO 12, 14 and 16 to the memory controller 22 at any instant and also passes on a line 72 the number of words in the burst count for that FIFO. The request from the data fetch interface 24 to the memory controller 22 is provided on a line 74 and the acknowledgment of this request is provided on the line 74 from the memory controller 22 to the data fetch interface 24. Such a request and an acknowledgment on the line 74 are designated as a "handshake" in FIG. 2.

The data controller 22 then sends the appropriate data words from the memory 20 to the data fetch interface 24 on a line 76. Valid lines 80, 82 and 84 are respectively provided from the data fetch interface 24 to the FIFO 12, 14 and 16. These lines provide a signal to the appropriate FIFO that the data words in the burst count for such FIFO are being provided to such FIFO. The data passing from the data fetch interface 24 to the activated one of the FIFO 12, 14 and 16 is provided on a bus 88.

The system and method of this invention accordingly establish priorities for the transfer of data into individual FIFO such as the FIFO 12, 14 and 16. These priorities are established on a software basis by the data fetch interface 24 and the memory controller 22. The priorities are established for each FIFO by selecting particular values for the low region and the burst count in such FIFO.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

We claim:

1. A method of providing a priority in reading words from a memory, including the steps of:

providing a plurality of FIFO's each having input and output ends and constructed to receive words at the input end and to pass the words from the output end in the same order as received at the input end, the information represented by the words in each FIFO being different from the information represented by the words in the other FIFO's, allocating within each FIFO a low region indicating the minimum number of words that should be stored in the FIFO at all times, maintaining a word count for each FIFO indicating the number of words introduced to such FIFO upon each such introduction of words to such FIFO, allocating within each FIFO a high region indicating where a burst count is not to be initiated for introduction to such FIFO, allocating within each FIFO an intermediate region between the low and high regions for introducing words from memory into the FIFO on a lower priority basis than a priority basis for introducing words into the low region individual to each FIFO, and prioritizing the introduction of burst counts to each individual one of the FIFO's in accordance with the values established for the low region and the burst count for such individual one of the FIFO's.

2. A method as set forth in claim 1 wherein each of the FIFO receives burst counts in at least the low region for such FIFO on a priority basis to fill the low region of such FIFO.

3. A method as set forth in claim 1 wherein the introduction of a burst count to each of the FIFO is not initiated for such FIFO when the number of words in such FIFO is within the high region of such FIFO.

4. A method as set forth in claim 1 wherein the transfer to each individual one of the FIFO of each increment of the word count for such FIFO is provided by a memory controller and wherein the memory controller provides a cumulative indication of the number of words transferred at each instant into such individual one of the FIFO.

5. A method as set forth in claim 1 wherein each individual one of the FIFO provides an indication on a cumulative basis of the number of the words transferred from the FIFO at each instant.

6. A method as set forth in claim 2 wherein the introduction of a burst count to each of the FIFO is not initiated for such FIFO when the number of words in such FIFO is within the high region of such FIFO, the transfer to each individual one of the FIFO of each increment of the word count for such FIFO is provided by a memory controller and wherein the memory controller provides a cumulative indication of the number of words transferred at each instant into such individual one of the FIFO and wherein each individual one of the FIFO provides an indication on a cumulative basis of the number of the words transferred from the FIFO at each instant.

7. A method of providing a priority in reading words from a memory, including the steps of:

providing a plurality of FIFO's each having input and output ends and each constructed to read words into the FIFO at the first end and to transfer words from the FIFO at the second end, operating each of the FIFO's on a recirculating basis, allocating within each of the FIFO's a first region having a particular number of words for providing for a transfer of words from the memory into the FIFO on a priority basis individual to such FIFO, maintaining for each of the FIFO's a burst count indicating a particular number of words to be transferred from the memory in each such transfer, the burst count being adjustable for prioritizing the introduction of burst counts to each individual ones of the FIFOs in accordance with the value established for the burst count, allocating within each of the FIFO's a second region which has a second particular number of words and in which a transfer of the burst count of the particular number of words into the FIFO is not to be initiated, and transferring from the memory into each individual ones of the FIFO's of burst counts for such FIFO dependent upon the number of words in such individual one of the FIFO's relative to the first particular number of words in the first region in such individual one of The FIFO's and relative to the second particular number of words in the second region in such individual one of the FIFO's.

8. A method as set forth in claim 7, including the step of:

transferring burst counts on a priority basis from the memory to each individual one of the FIFO's to fill the first region of such FIFO with words.

9. A method as set forth in claim 7 wherein the priority provided for each of the FIFO in filling the first region of such FIFO is dependent upon the number of words capable of being filled in the first region of such FIFO and dependent upon the burst count for such FIFO.

10. A method as set forth in claim 7 wherein the burst counts for each FIFO are transferred into the input end of such FIFO to fill any region in such FIFO between the first and second regions during the times when words are not being transferred from the memory to any of the FIFO.

11. A method as set forth in claim 7 wherein the transfer of the burst counts for each FIFO from the memory into the FIFO is initiated in the portion of the FIFO other than the second region in the FIFO and is continued into the second region in the FIFO when such transfer is initiated from a position outside of the second region of the FIFO.

12. A method as set forth in claim 11 wherein the burst counts for each FIFO are prevented from being transferred from the memory into the second region in the FIFO when such transfer is initiated from a position in the second region in the FIFO.

13. A method as set forth in claim 8 wherein the priority provided for each of the FIFO in filling the first region of such FIFO is dependent upon the number of words capable of being filled in the first region of such FIFO and dependent upon the burst count for such FIFO, the burst count for each FIFO are transferred into the input end of such FIFO to fill any region in such FIFO between the first and second regions during the times when words are not being transferred from the memory to any of the FIFO, the transfer of the count for each FIFO from the memory into the FIFO is initiated in the portion of the FIFO other than the second region in the FIFO and is continued into the second region in the FIFO when such transfer is initiated from a position outside of the second region of the FIFO, and the burst counts for each FIFO are prevented from being transferred from the memory into the second region in the FIFO when such transfer is initiated from a position in the second region in the FIFO.

14. A method of providing a priority in reading words from a memory, including the steps of:

providing a memory controller, providing a data fetch interface, providing a plurality of FIFO's each having an input end for receiving words from the memory controller through the data fetch interface and each having an output end for transferring words from the FIFO in the same order as the words are received at the input end of the FIFO, maintaining in the data fetch interface for each FIFO a count of the number of words to be transferred in a burst from the memory controller through the data fetch interface to such FIFO in each transfer of words to the FIFO, allocating within each FIFO a first region for receiving bursts of words on a priority basis until such first region in such FIFO becomes fall with words, the first region in each FIFO becoming refilled on a priority basis with bursts of words when words are transferred from the first region, allocating within each FIFO a second region wherein the initiation of transfers of bursts of words into the region is prevented, allocating within each FIFO a third region between the first and second regions for the transfer of the words in each burst for such FIFO into the third region on a lower priority basis than the priority basis for the transfer of bursts of words into the first region for such FIFO when the memory controller would otherwise be idle, communicating at each instant from the data fetch interface to the memory controller the address of the FIFO for receiving the word transfer in each burst and the count of such word transfer in each burst, and transferring the words in each burst from the memory controller through the data fetch interface to each FIFO in accordance with requests from the data fetch interface to the memory controller for such FIFO.

15. In a method as set forth in claim 14, including the steps of:

communicating a request from the data fetch interface to the memory controller for each of the FIFO's for the transfer to such FIFO of the words in each burst for such FIFO, and communicating an acknowledgment from the memory controller to the data fetch interface of the request from the data fetch interface to the memory controller for the transfer to each of the FIFO's of the words in each burst for such FIFO.

16. A method as set forth in claim 15 wherein the words in each burst for each FIFO are transferred from the memory controller through the data fetch interface to such FIFO after the acknowledgment from the memory controller to the data fetch interface of the request from the data fetch interface to the memory controller for the transfer to each of the FIFO of the words in each burst for such FIFO.

17. A method as set forth in claim 14 wherein each FIFO is provided with a first region for receiving words in each burst on a priority basis until such first region in such FIFO becomes filled with words and wherein the priorities for the different FIFO are dependent upon the number of words capable of being provided in the first region for such FIFO and upon the number of words in each burst for such FIFO.

18. A method of providing a priority in reading words from a memory including the steps of:

providing a plurality of FIFO's each having an input end for transferring words into the FIFO and having an output end for transferring words from the FIFO, providing a memory controller for transferring words into the input end of the FIFO, maintaining a first count in the memory controller of the number of words transferred into the input end of each FIFO, maintaining a second count of the words transferred from the output end of the FIFO, allocating a first region in each FIFO with a particular number of words, determining at each instant from the first count and the second count whether the first region in such FIFO is full, transferring words on a priority basis to the input end of each FIFO to maintain the first region in such FIFO full, and maintaining for each of the FIFOs a burst count indicating a particular number of words to be transferred from the memory in each such transfer, the burst count being adjustable for prioritizing the word transfers to each individual ones of the FIFOs in accordance with the value established for the burst count.

19. A method as set forth in claim 18, including the steps of;

allocating within each FIFO a second region for indicating that such FIFO has a number of words greater by a particular amount than the maximum number of words in the first region, determining at each instant from the count by the memory controller of the number of words transferred into the input end of each FIFO and from the count of the words transferred from such FIFO whether the number of words in the FIFO is in the second region, and inhibiting the initiation of the transfer of words from the memory controller to each FIFO when the words in such FIFO are in the second region in the FIFO prior to the initiation of the transfer of the words from the memory controller to such FIFO.

20. A method as set forth in claim 19, including the steps of:

allocating a third region in each FIFO between the first and second regions in such FIFO and filling such third region in each FIFO with words on a lower priority basis than the priority for filling the first region in such FIFO with words.

21. A method as set forth in claim 18, including the steps of:

establishing priorities in accordance with a data fetch interface for the transfer of words from the memory controller through the data fetch interface to such individual one of the FIFO's to fill the first region of such FIFO with words on a priority relative to the other FIFO's established by the data fetch interface.

* * * * *